United States Patent
Ogisu (10) Patent No.: US 12,449,065 B2
(45) Date of Patent: Oct. 21, 2025

(54) PRESSURE CONTROL VALVE

(71) Applicant: CKD CORPORATION, Komaki (JP)

(72) Inventor: Toshikazu Ogisu, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 18/683,450

(22) PCT Filed: Dec. 14, 2022

(86) PCT No.: PCT/JP2022/046060
§ 371 (c)(1),
(2) Date: Feb. 13, 2024

(87) PCT Pub. No.: WO2023/171071
PCT Pub. Date: Sep. 14, 2023

(65) Prior Publication Data
US 2024/0344633 A1    Oct. 17, 2024

(30) Foreign Application Priority Data
Mar. 8, 2022  (JP) ................... 2022-035237

(51) Int. Cl.
*F16K 51/02*  (2006.01)
*F16K 49/00*  (2006.01)

(52) U.S. Cl.
CPC ............. *F16K 51/02* (2013.01); *F16K 49/00* (2013.01)

(58) Field of Classification Search
CPC ......... Y10T 137/6606; Y10T 137/6579; F16K 49/002; F16K 49/007; F16K 51/02; F16K 49/00
See application file for complete search history.

(56) References Cited

U.S. PATENT DOCUMENTS 3,110,319 A * 11/1963 Arata .................. F16K 51/02
                                                       137/340
5,485,542 A *  1/1996 Ericson ............... F16K 49/002
                                                       137/341

(Continued)

FOREIGN PATENT DOCUMENTS

JP          06185671 A  *  7/1994
JP       H08-042734 A       2/1996

(Continued)

OTHER PUBLICATIONS

Machine Translation of WO2011/105737 retrieved from espacenet.com Apr. 2025 (Year: 2025).*

(Continued)

*Primary Examiner* — Jessica Cahill
(74) *Attorney, Agent, or Firm* — Oliff PLC (57) ABSTRACT

A pressure control valve for opening/closing a circular outlet port that connects a vacuum chamber used in a semiconductor manufacturing apparatus and an exhaust pump for evacuating the vacuum chamber, the pressure control valve including a valve unit that contacts and separates from a valve seat provided radially outward from the outlet port, wherein the valve unit includes: a hollow portion located between an upper surface of the valve unit on the vacuum chamber side and a lower surface of the valve unit on the exhaust pump side; a first rubber heater covering a first rear surface of the upper surface in the hollow portion; and a second rubber heater covering a second rear surface of the lower surface in the hollow portion.

4 Claims, 6 Drawing Sheets

(56) References Cited

U.S. PATENT DOCUMENTS

| | | | | | |
|---|---|---|---|---|---|
| 5,642,751 | A | * | 7/1997 | Crawley | B65D 90/582 |
| | | | | | 137/340 |
| 5,678,595 | A | * | 10/1997 | Iwabuchi | F16K 51/02 |
| | | | | | 137/341 |
| 5,755,255 | A | * | 5/1998 | Iwabuchi | F16K 3/184 |
| | | | | | 137/341 |
| 6,321,780 | B1 | * | 11/2001 | Iwabuchi | F16K 49/002 |
| | | | | | 137/341 |
| 2003/0116193 | A1 | * | 6/2003 | Fukuda | F16K 49/002 |
| | | | | | 137/341 |
| 2017/0356569 | A1 | * | 12/2017 | Netzer | F16K 1/24 |
| 2020/0049278 | A1 | * | 2/2020 | Hosek | F16K 31/0693 |

FOREIGN PATENT DOCUMENTS

| | | | |
|---|---|---|---|
| KR | 10-2011-0097395 A | 8/2011 | |
| WO | WO-2011105737 A2 * | 9/2011 | ............. F16K 3/182 |

OTHER PUBLICATIONS

Dec. 18, 2024 Office Action issued in Korean Patent Application No. 10-2024-7007432.
Sep. 10, 2024 International Preliminary Report on Patentability issued in International Patent Application No. PCT/JP2022/046060.
Feb. 21, 2023 International Search Report issued in International Patent Application No. PCT/JP2022/046060.

\* cited by examiner

PRESSURE CONTROL VALVE

CROSS-REFERENCE

This is a national phase application filed under 35 U.S.C. 371 of PCT/JP2022/046060 filed on Dec. 14, 2022, which claims the benefit of priority from the prior Japanese Patent Application No. 2022-035237 filed on Mar. 8, 2022, the entire contents of all of which are incorporated herein by reference.

TECHNICAL FIELD

The present invention relates to a pressure control valve to open and close a circular opening portion connecting a vacuum chamber used for a semiconductor manufacturing apparatus and an exhaust pump for evacuating the vacuum chamber.

BACKGROUND ART

Surface processing (such as etching) in the semiconductor manufacturing apparatus is performed in a manner that a wafer is disposed in a vacuum chamber and various process gases are introduced in the vacuum chamber. The vacuum chamber is connected to an exhaust pump via an exhaust port, and the process gas introduced in the vacuum chamber is sucked by the exhaust pump and discharged out of the exhaust port. The exhaust port is provided with a pressure control valve for opening and closing the exhaust port so that an exhaust amount of the process gas to be discharged from the exhaust port can be regulated by adjusting an open degree of the pressure control valve. Thus, the pressure inside the vacuum chamber can be controlled. As a pressure control valve, for example, a main valve disclosed in the Patent Document 1 has been known.

RELATED ART DOCUMENTS

Patent Documents

Patent Document 1: JP H08-42734A

SUMMARY OF INVENTION

Problems to be Solved by the Invention

A process gas introduced in a vacuum chamber is set at a high temperature of about 100° C., for example, but the process gas is then cooled by the contact with a valve unit of the pressure control valve when the gas is to be discharged from the vacuum chamber. This could result in deposition of components of the process gas on a surface of the valve unit. Deposition of the process gas components on the valve unit surface could cause float of particles during surface processing of the wafer, and the floating particles could result in failure in the surface processing.

The present invention has been made in view of the above circumstances and has a purpose of providing a pressure control valve which can prevent cooling of the process gas during evacuation of the vacuum chamber and which can prevent generation of particles.

Means of Solving the Problems

To solve the above problem, a pressure control valve according to one aspect of the present invention has the following configuration.

The pressure control valve is configured to open and close an opening portion of a circular shape, the opening portion connecting a vacuum chamber used for a semiconductor manufacturing apparatus and an exhaust pump for evacuating the vacuum chamber, wherein the pressure control valve comprises a valve unit to be brought into or out of contact with a valve seat provided outward in a radial direction of the opening portion, the valve unit includes: a hollow portion positioned between an upper surface of the valve unit on a side of the vacuum chamber and a lower surface of the valve unit on a side of the exhaust pump; a first planar heater covering a first rear-side face of the upper surface in the hollow portion; and a second planar heater covering a second rear-side face of the lower surface in the hollow portion.

According to the above-mentioned pressure control valve, the valve unit includes the hollow portion positioned between the upper surface of the valve unit on the vacuum chamber side and the lower surface of the valve unit on the exhaust pump side, so that a thermal capacity is made small. In addition to this, the valve unit includes a first planar heater covering a rear-side face of the upper surface in the hollow portion and a second planar heater covering a rear-side face of the lower surface in the hollow portion, and thus the entire upper surface and the entire lower surface of the valve unit can be uniformly heated.

In evacuation of the vacuum chamber, the process gas mainly comes to contact with the upper surface and the lower surface of the valve unit. Accordingly, as long as it is possible to uniformly heat the entire upper surface and the entire lower surface of the valve unit, the process gas can be prevented from being cooled down by the valve unit. Thereby, the components of the process gas can be prevented from being deposited on the surface of the valve unit, and further, the deposited components are prevented from floating as particles, thereby reducing the possibility of failure in the surface processing of the wafer.

Conventionally, it has been known that components of process gas deposited on an upper surface (namely, a surface on an upstream side) of a valve unit could float in a vacuum chamber as particles. On the other hand, the components of the process gas deposited on the lower surface (namely, a surface on a downstream side) of the valve unit have been considered to flow out with the process gas during evacuation, and thus the components have not been considered to float in the vacuum chamber. However, the present inventors consider the process gas components deposited on the lower surface would float in the vacuum chamber as the particles. Therefore, the above-mentioned pressure control valve is configured to prevent generation of the particles by heating not only the upper surface but also the lower surface of the valve unit by the planar heaters.

Further, in the above-mentioned pressure control valve, preferably, a thickness from the upper surface to the first rear-side face and a thickness from the lower surface to the second rear-side face are 4 mm or larger and 8 mm or less.

The thinner the thickness from the upper surface to the first rear-side face and the thickness from the lower surface to the second rear-side face are, the smaller the thermal capacity of the valve unit becomes, which facilitates heating by the first planar heater and the second planar heater. However, the strength of the valve unit becomes low. It is thus important to make a balance between the thermal capacity and the strength. The present inventors have confirmed from experiments that preferable balance between the thermal capacity and the strength can be achieved by setting the thickness from the upper surface to the first rear-side face and the thickness from the lower surface to the second rear-side face to be 4 mm or larger and 8 mm or less as the above-mentioned pressure control valve.

Further, in the above pressure control valve, preferably, the valve unit includes an annular sealing portion to be brought into or out of contact with the valve seat, and the hollow portion is positioned on an inner circumferential side in a radial direction of the annular sealing portion.

The valve unit provided with the hollow portion has a strength lower than a solid valve unit. Accordingly, when the hollow portion of the valve unit is provided on a rear side of the annular sealing portion, the valve unit could be bent when the annular sealing portion comes to contact with the valve seat, so that the force for pressing the annular sealing portion to the valve seat could be absorbed. According to the above-mentioned pressure control valve, the hollow portion is positioned on an inner circumferential side in the radial direction of the annular sealing portion, and thus the rear side of the annular sealing portion of the valve unit can be solid to prevent bending of the valve unit. Thus, it is possible to prevent absorption of the force for pressing the annular sealing portion to the valve seat.

Further, in the above-mentioned pressure control valve, preferably, a cooling gas supply passage configured to supply cooling gas is communicated with the hollow portion.

Since a temperature condition for surface processing of a wafer differs depending on a type of process gas, there is a case that a temperature of a valve unit of a pressure control valve needs to be lowered. Heretofore, waiting time has been needed for natural reduction in the temperature of the valve unit, which has caused concerns about efficiency degradation in a surface processing step of the wafer. According to the above-mentioned pressure control valve, however, the cooling gas supply passage for supplying the cooling gas is communicated, so that the temperature of the valve unit can be promptly reduced by supplying the cooling gas to the hollow portion.

Effects of the Invention

According to the pressure control valve of the present invention, process gas can be prevented from cooling during evacuation of a vacuum chamber, and thus generation of particles can be prevented.

MODE FOR CARRYING OUT THE INVENTION

First Embodiment

A first embodiment of a pressure control valve according to the present invention is explained with reference to the drawings.

Figure 1:
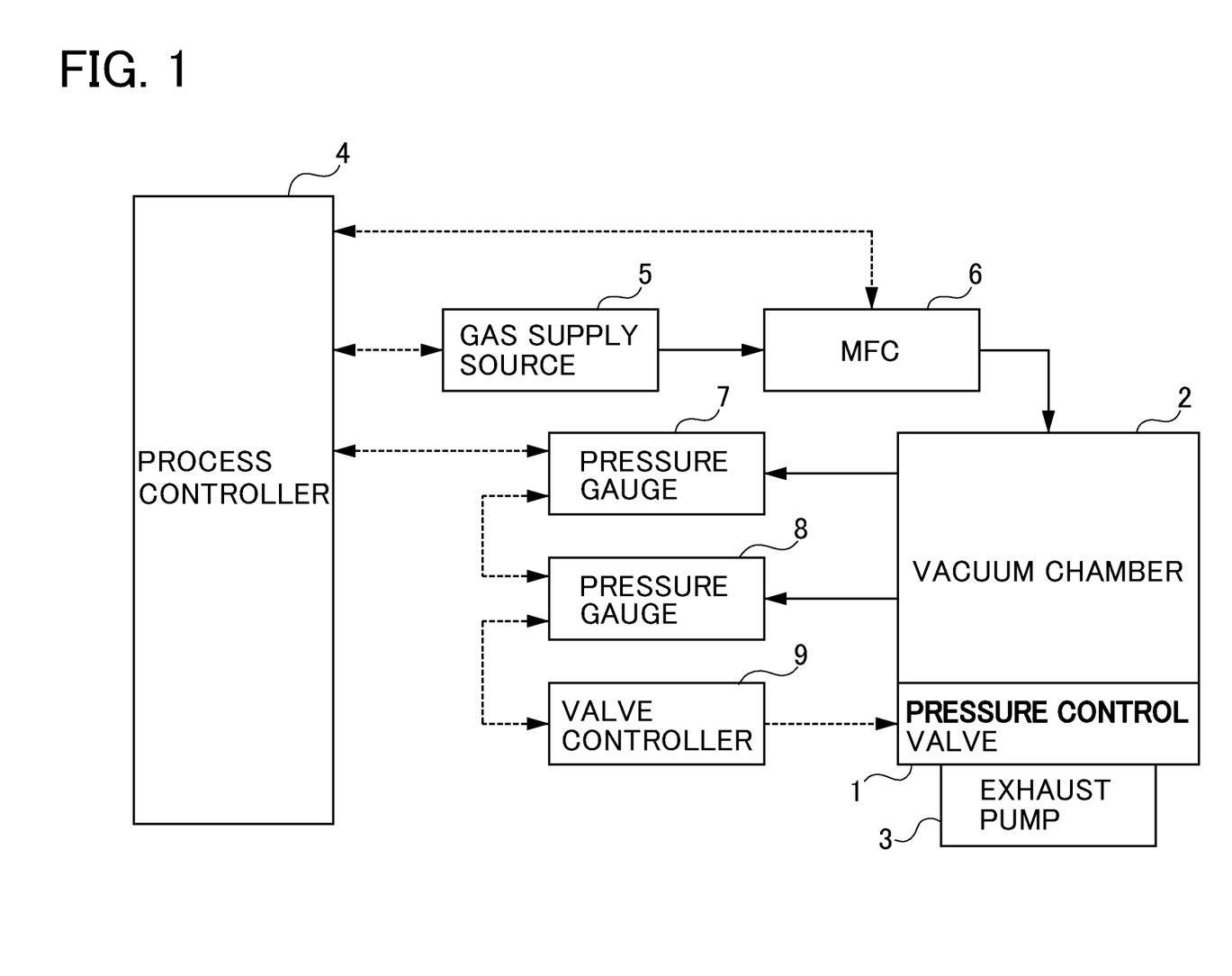
FIG. 1 is a schematic configurational view of a semiconductor manufacturing apparatus for surface processing of a wafer.
Figure 2:
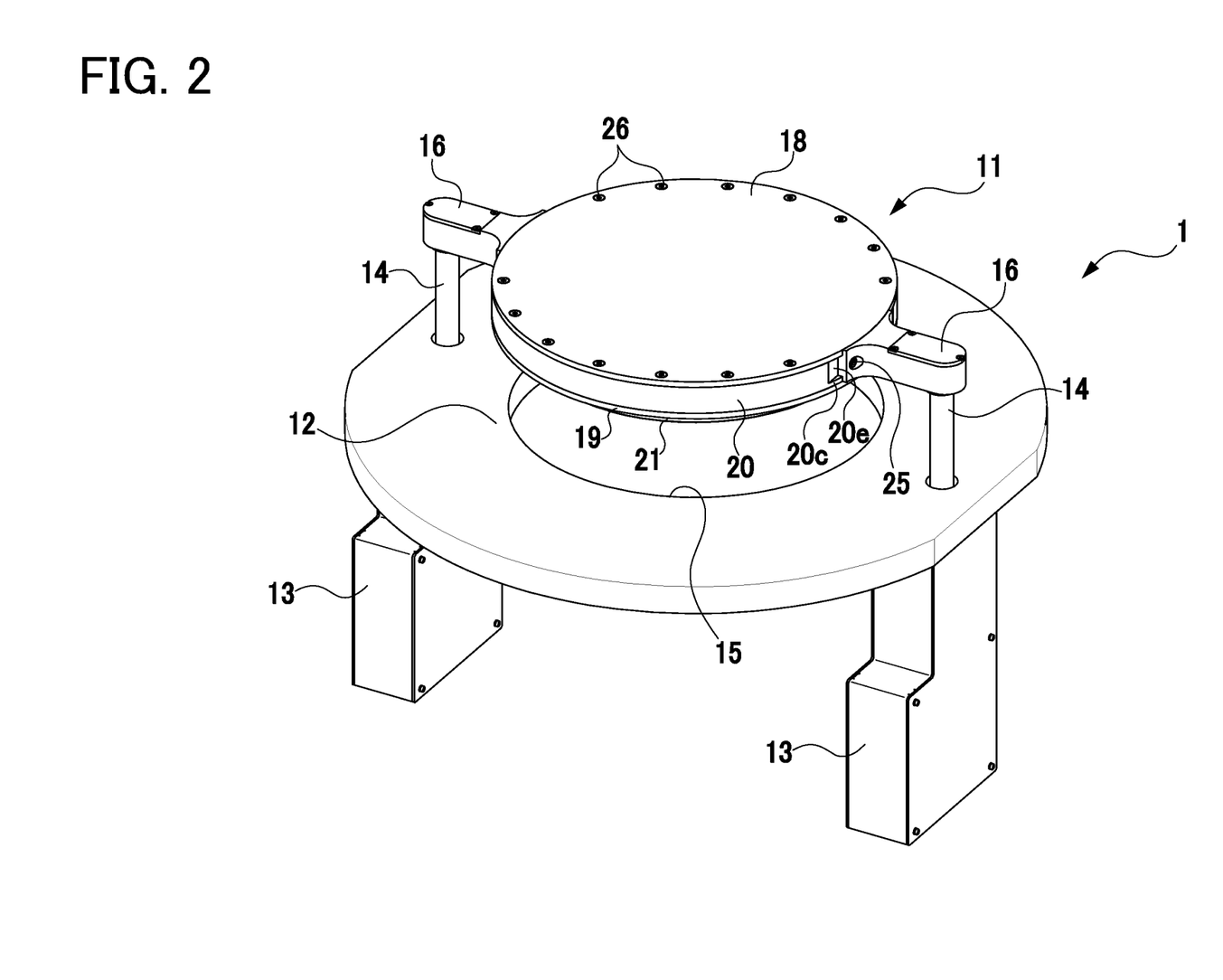
FIG. 2 is a perspective view of a pressure control valve in a first embodiment.
Figure 3:
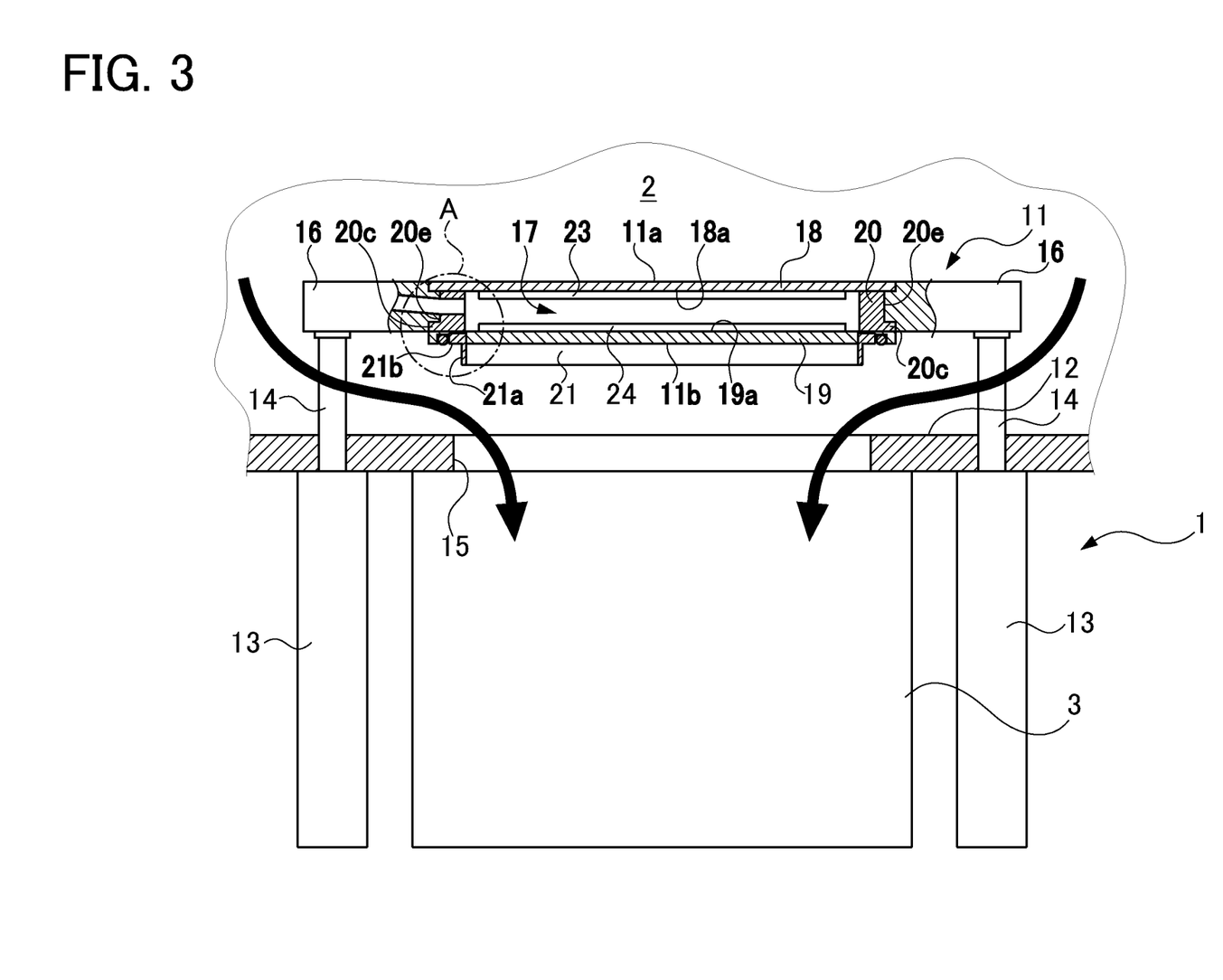
FIG. 3 is a partial sectional view of the pressure control valve in the first embodiment.
Figure 4:
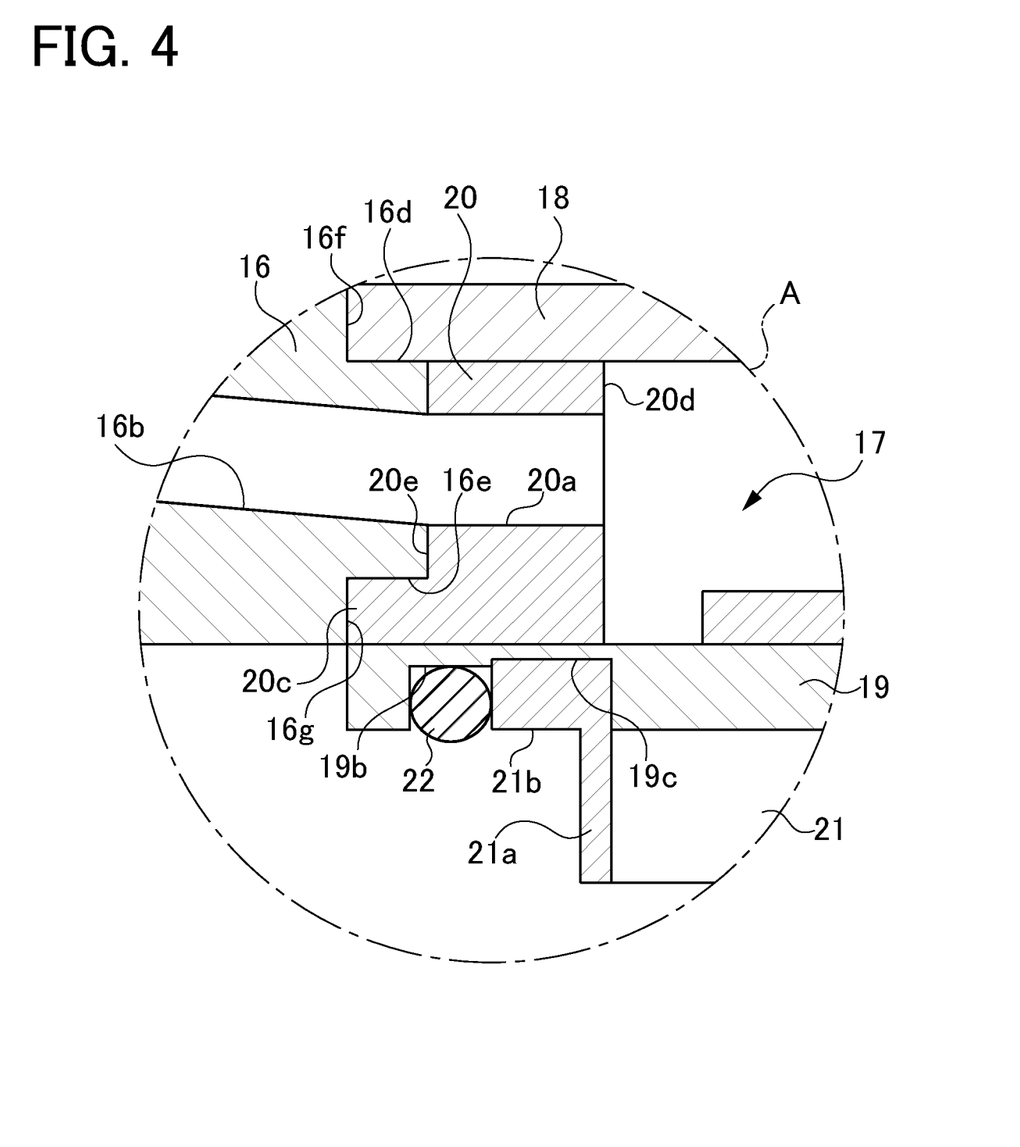
FIG. 4 is a partial enlarged view of a part A in FIG. 3.

FIG. 1 is a schematic configurational view of a semiconductor manufacturing apparatus for performing surface processing of a wafer. FIG. 2 is a perspective view of a pressure control valve 1 according to the first embodiment. FIG. 3 is a partial sectional view of the pressure control valve 1 according to the present embodiment. Herein, arrows in the drawings represent flow of process gas during evacuation. FIG. 4 is a partial enlarged view of a part A in FIG. 3.

As shown in FIG. 1, the semiconductor manufacturing apparatus is provided with a pressure control valve 1, a vacuum chamber 2, an exhaust pump 3, a process controller 4, a gas supply source 5, a mass flow controller (MFC) 6, pressure gauges 7 and 8, and a valve controller 9.

A wafer to be applied with surface processing is placed inside the vacuum chamber 2. The gas supply source 5 is a supply source of process gas used for the surface processing of the wafer. The process gas output from the gas supply source 5 is adjusted its flow rate by the MFC 6 and then introduced into the vacuum chamber 2.

The pressure gauges 7 and 8 measure pressure in the vacuum chamber 2. The process controller 4 is electrically connected to the gas supply source 5, the MFC 6, and the pressure gauge 7. Thus, the process controller 4 monitors pressure values measured by the pressure gauge 7 and also performs turning on an off of output of the process gas from the gas supply source 5 and adjusting a flow rate of the process gas by the MFC 6.

On a bottom surface of the vacuum chamber 2, as shown in FIG. 3, a circular-shaped outlet port 15 (one example of an opening portion) is formed to pass through. Further, an outer circumferential vicinity in the radial direction of the outlet port 15 constitutes a valve seat 12, which will be explained below, to be brought into or out of contact with the valve unit 11.

The vacuum chamber 2 is connected to the exhaust pump 3 via the outlet port 15. Operation of the exhaust pump 3 enables evacuation of the process gas that has been introduced into the vacuum chamber 2 from the outlet port 15.

The pressure control valve 1 is a valve for controlling pressure inside the vacuum chamber 2 by adjusting the exhaust amount of the process gas which is discharged from the outlet port 15. The pressure control valve 1 is electrically connected to the valve controller 9, and further, the pressure gauge 8 is electrically connected to the valve controller 9. Thereby, the valve controller 9 monitors pressure values measured by the pressure gauge 8 and also adjusts an opening degree of the pressure control valve 1 such that the pressure value in the vacuum chamber 2 becomes the optimum pressure for surface processing.

The pressure control valve 1 is provided with the valve unit 11 and a pair of actuators 13 as shown in FIGS. 2 and 3. A pair of the actuators 13 are placed on radially outer sides of the outlet port 15 with the exhaust pump 3 held therebetween. From each of the pair of the actuators 13, a rod 14 to be driven in a penetration direction (in an upper and lower direction in FIG. 3) of the outlet port 15 protrude to the vacuum chamber 2. The rods 14 are covered with bellows (not shown), for example, and thus inside and outside of the vacuum chamber 2 are not communicated with each other in portions where the rods 14 are inserted.

On respective leading ends of the rods 14 in the vacuum chamber 2, the valve unit 11 is fixed to bridge over the rods 14. Thus, by driving the rods 14, the valve unit 11 is movable in a stepless manner along an upper and lower direction in FIG. 3 between a closed position where the outlet port 15 is shut off and an open position where the outlet port 15 is open. Specifically, the valve controller 9 can perform stepless adjustment of an opening degree of the valve unit 11 by adjusting a driving amount of the rods 14. Herein, a stroke between the closed position and the open position is not particularly limited, but in the present embodiment, the stroke is set as about 100 mm. Further, the pressure control valve 1 shown in FIGS. 2 and 3 illustrates a state in which the valve unit 11 is in the open position.

The valve unit 11 is provided with a main body 20, a pair of support members 16 supporting the main body 20, an upper plate 18 of a disk-like shape constituting an upper surface 11a of the valve unit 11, a lower plate 19 of a disk-like shape constituting a lower surface 11b of the valve unit 11, a valve unit block 21, an O ring 22 (one example of an annular sealing portion), a first rubber heater 23 (one example of a first planar heater), and a second rubber heater 24 (one example of a second planar heater).

The main body 20 is made of aluminum alloy and is formed to be a cylindrical shape in which upper and lower ends are open. In a portion of an outer circumferential surface of the main body 20 where the support member 16 faces, a flat surface portion 20e is cut away to form a flange portion 20c on a lower end portion of the main body 20.

The support members 16 are made of aluminum alloy and each formed to have a thickness of about 30 mm. The support members 16 are joined to the rods 14 on end portions opposite to the main body 20 side. Further, end portions of the support members 16 on the main body 20 side are made to abut on the flat surface portion 20e of the main body 20, and the support members 16 are coupled with the main body 20 by bolts 25 (see FIG. 2) which are threaded with the flat surface portion 20e in the vertical direction. Thus, the pair of the support members 16 are placed coaxially with the outlet port 15 to support the main body 20. In FIG. 2, only one bolt 25 is seen in the figure, but each support member 16 holds the two bolts 25.

Further, each of the support members 16 is drilled with an upper step portion 16d on the upper surface 11a side as an end portion on the main body 20 side (see FIG. 4). A depth of the upper step portion 16d is almost same with a thickness of the upper plate 18. Further, an inner surface 16f of the upper step portion 16d facing the main body 20 side is a circular arcuate surface having a radius almost same with an outer diameter of the disk-like upper plate 18. Further, each of the support members 16 is drilled with a lower step portion 16e on the lower surface 11b side as an end portion on the main body 20 side (see FIG. 4). A depth of the lower step portion 16e is almost same with a thickness of a flange portion 20c of the main body 20. Further, an inner surface 16g of the lower step portion 16e facing the main body 20 side is a circular arcuate surface having a radius almost same with an outer diameter of the main body 20 (the flange portion 20c). In a state in which the support members 16 are coupled with the main body 20, the flange portion 20c of the main body 20 is positioned inside the lower step portion 16e of the support member 16, and thus a lower surface of the main body 20 and lower surfaces of the support members 16 form a flush plane surface.

The upper plate 18 is made of aluminum alloy and formed to be a disk-like shape having a thickness of about 5 mm. An outer diameter of the upper plate 18 is almost same as the outer diameter of the main body 20. The upper plate 18 is fixed to an end face of the body member 20 on the upper surface 11a side by bolts 26 (see FIG. 2). Thus, the upper plate 18 is positioned coaxially with the main body 20 and closes an upper-side opening of the main body 20. Further, while being fixed to the main body 20, the upper plate 18 is positioned inside the upper step portion 16d of the support member 16 so that an upper surface of the upper plate 18 and upper surfaces of the support members 16 form a flush plane surface. Herein, the upper plate 18 may be applied with surface processing such as anodizing treatment.

The lower plate 19 is made of aluminum alloy and formed to be a disk-like shape having a thickness of about 5 mm. An outer diameter of the lower plate 19 is almost same as an outer diameter of the main body 20. Further, the lower plate 19 is fixed to an end face of the body member 20 on the lower surface 11b side. By this configuration, the lower plate 19 is positioned coaxially with the body member 20 and closes a lower-side opening of the body member 20. Herein, the lower plate 19 may be applied with surface processing such as anodizing treatment.

The upper plate 18 closes the upper-side opening of the body member 20, and the lower plate 19 closes the lower-side opening of the body member 20. By this configuration, the valve unit 11 is formed with a hollow portion 17 as a space surrounded by the rear-side face 18a (a first rear-side face) of the upper plate 18, the inner circumferential surface 20d of the body member 20, and the rear-side face 19a (a second rear-side face) of the lower plate 19.

In the hollow portion 17, a first rubber heater 23 and a second rubber heater 24 are disposed. The first rubber heater 23 is formed in a disk-like shape. A diameter thereof is smaller than an inner diameter of the body member 20 but large enough to cover an exposed portion of the rear-side face 18a of the upper plate 18 exposed in the hollow portion 17. The first rubber heater 23 is bonded to the rear-side face 18a of the upper plate 18, and thus the first rubber heater 23 can heat the upper plate 18. The second rubber heater 24 is a similar heater with the first rubber heater 23 and is formed in a disk-like shape. A diameter thereof is smaller than the inner diameter of the body member 20 but large enough to cover an exposed portion of the rear-side face 19a of the lower plate 19 exposed in the hollow portion 17. The second rubber heater 24 is bonded to the rear-side face 19a of the lower plate 19, and thus the second rubber heater 24 can heat the lower plate 19.

Electrical conduits 16b and 20a pass through the hollow portion B17 so that an electrical wire passing inside the rod 14 can pass through the electrical conduits 6b and 20a to extend to the hollow portion 17. Accordingly, the first rubber heater 23 and the second rubber heater 24 can be electrically connected to the valve controller 9. Therefore, the first rubber heater 23 and the second rubber heater 24 are controlled their temperatures by the valve controller 9. Then, the first rubber heater 23 and the second rubber heater 24 heat the upper plate 18 and the lower plate 19 to the temperature (for example, 120° C.) at which the process gas introduced in the vacuum chamber 2 would not be liquefied by the contact with the valve unit 11 (the upper plate 18, the lower plate 19).

The valve unit 11 is provided with the hollow portion 17 and thus a thermal capacity is made small. Furthermore, the valve unit 11 is provided with the first rubber heater 23 covering the rear-side face 18a and the second rubber heater 24 covering the rear-side face 19a, and thus the entire upper surface 11a and the entire lower surface 11b of the valve unit 11 can be uniformly heated.

In evacuation of the vacuum chamber 2, the process gas comes to mainly contact with the upper surface 11a and the lower surface 11b of the valve unit 11. Therefore, as long as the entire upper surface 11a and the entire lower surface 11b of the valve unit 11 are uniformly heated, the process gas can be prevented from cooling by the valve unit 11. Thus, components of the process gas can be prevented from being deposited on the surfaces of the valve unit 11, and this can achieve reduction in the possibility that the deposited components float as particles to cause failure in the surface processing of the wafer.

Herein, each thickness of the upper plate 18 and the lower plate 19 is set as 5 mm, but this is only one example. The thinner the thicknesses of the upper plate 18 and the lower plate 19 are, the smaller the thermal capacity of the valve unit 11 becomes, and accordingly, heating by the first rubber heater 23 and the second rubber heater 24 is facilitated. On the other hand, strength of the valve unit 11 becomes low. It is therefore important to make a balance between the thermal capacity and the strength. Consequently, the thicknesses of the upper plate 18 and the lower plate 19 are preferably set to be in a range of 4 mm or larger and 8 mm or less.

A portion of a face forming the lower surface 11b of the lower plate 19 where faces the valve seat 12 is formed with an annular first groove 19b formed coaxial with the outlet port 15. The O ring 22 (one example of an annular sealing portion) is fitted in this first groove 19b. A closed position of the valve unit 11 represents a position where the O ring 22 is in contact with the valve seat 12. When the O ring 22 comes to contact with the valve seat 12, inside the vacuum chamber 2 can be kept hermetic by the elastic force of the O ring 22.

Herein, the above-mentioned hollow portion 17 is positioned on an inner circumferential side in the radial direction of the O ring 22. To be specific, a diameter of the hollow portion 17 (namely, an inner diameter of the main body 20) is made to be smaller than the diameter of the O ring 22. In other words, a portion of the valve unit 11 where the O ring 22 is attached is a solid portion, and thus the valve unit 11 is prevented from bending owing to the elastic force of the O ring 22 when the valve unit 11 is at the closed position.

On a radially inward side of the first groove 19b of the lower plate 19, an annular second groove 19c is formed coaxially with the outlet port 15. This second groove 19c is attached to the valve unit block 21.

The valve unit block 21 is made of aluminum alloy and includes a cylindrical body part 21a having openings on upper and lower ends and a flange portion 21b extending radially outward from an upper end portion of the body part 21a on the lower plate 19 side.

The flange portion 21b is provided with a first through hole (not shown) which can be inserted by a screw, and this first through hole penetrates through the flange portion 21b in the upper and lower direction in the figure. Furthermore, the lower plate 19 is provided with a second through hole (not shown) coaxial with the first through hole, and this second through hole penetrates through the lower plate 19 in the upper and lower direction in the figure. A bolt inserted through the first through hole and the second through hole is threaded with the main body 20, so that the valve unit block 21 is fixed to the second groove 19c and the lower plate 19 is fixed to the main body 20. Herein, the valve unit block 21 and the lower plate 19 may be individually fixed in such a manner that the valve unit block 21 is fixed to the lower plate 19, and then the lower plate 19 is fixed to the main body 20.

The body part 21a is positioned coaxially with the outlet port 15 in a state in which the valve unit block 21 is fixed. Further, an outer diameter of the body part 21a is made smaller than the outlet port 15, and thus the body part 21a is inserted in the outlet port 15 when the valve unit 11 is at the closed position.

Figure 5:
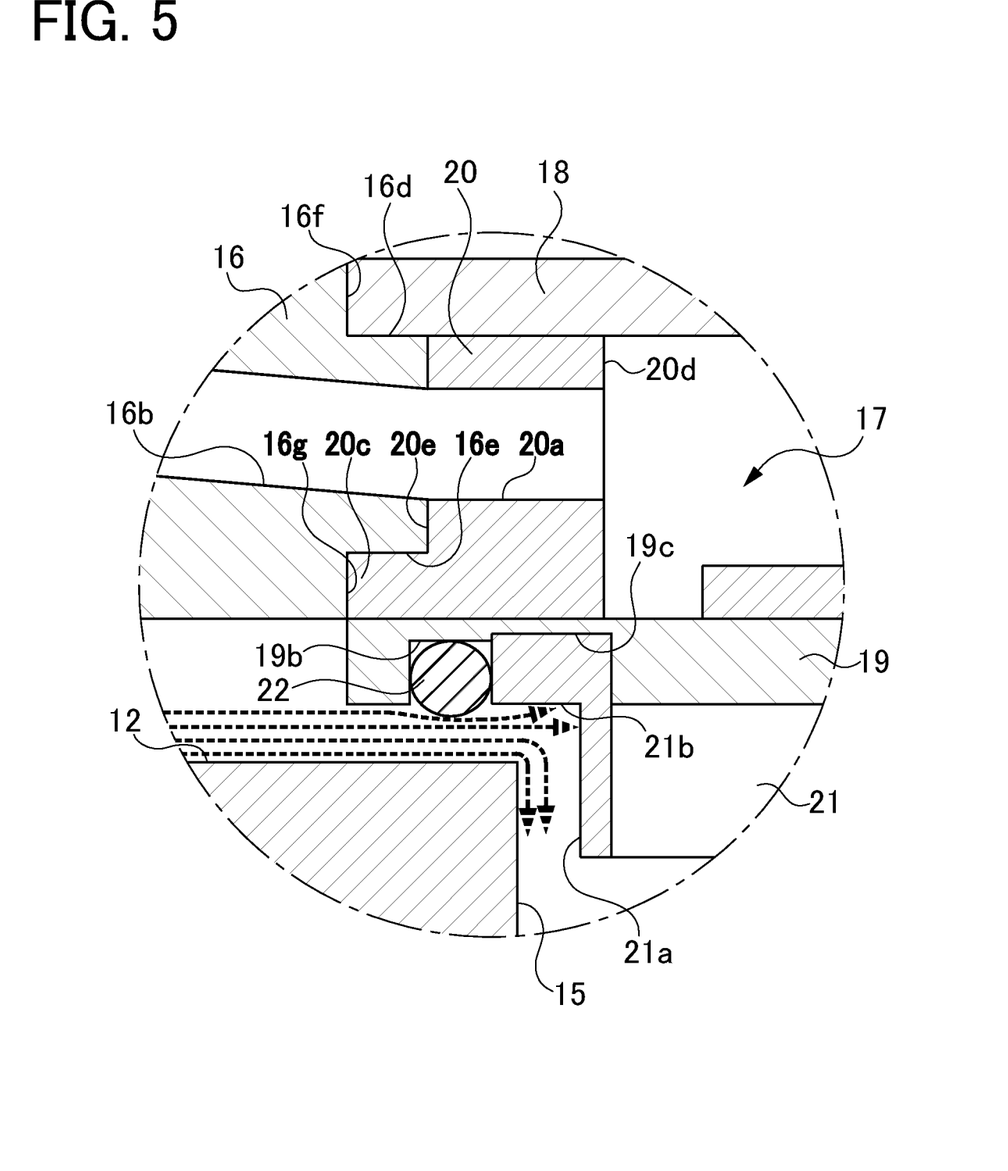
FIG. 5 is a partial enlarged view of a valve unit directly after starting movement from a closed position to an open position.

By inserting the body part 21a into the outlet port 15, the valve unit block 21 prevents rapid change in the pressure inside the vacuum chamber 2 which could happen when the valve unit 11 starts to move from the closed position to the open position. To be specific, when the valve unit 11 includes no valve unit block 21, a passage with a size of an inner diameter of the outlet port 15 is formed directly after the valve unit 11 starts to move from the closed position to the open position, so that evacuation of the process gas occurs suddenly, which results in rapid change in pressure inside the vacuum chamber 2. On the other hand, as indicated in the present embodiment, on condition that the body part 21a of the valve unit block 21 is inserted in the outlet port 15 when the valve unit 11 is at the closed position as shown in FIG. 5, at the moment when the valve unit 11 starts to move from the closed position to the open position, only a passage corresponding to a gap between the inner diameter of the outlet port 15 and the outer diameter of the body part 21a is formed. Accordingly, evacuation of the process gas is started slowly. Therefore, rapid change in the pressure in the vacuum chamber 2 can be prevented. When the valve unit 11 is moved by about 10 mm to 70 mm from the closed position to the open position, the body part 21a comes out of the outlet port 15, and thus a passage by the diameter of the outlet port 15 can be assured.

The valve unit 11 is provided with the valve unit block 21, and thus the evacuated process gas seems not to be in contact with the lower surface 11b of the valve unit 11. That is why heating the lower plate 19 by the second rubber heater 24 seems to have no effect of preventing deposition of the process gas components. It is true that the process gas rarely contacts the lower surface 11b in a state in which the valve unit 11 starts to move from the closed position and the body part 21a of the valve unit block 21 is inserted in the outlet port 15. However, after the body part 21a comes out of the outlet port 15, the process gas moves around the body part 21a to come to contact with the lower surface 11b. Therefore, heating the lower plate 19 by the second rubber heater 24 achieves the effect of preventing deposition of the process gas components.

As explained above, the pressure control valve 1 according to the first embodiment opens and closes a circular opening portion (the outlet port 15) connecting the vacuum chamber 2 used for the semiconductor manufacturing apparatus and the exhaust pump 3 for evacuating the vacuum chamber 2. The pressure control valve 1 includes the valve unit 11 to be brought into or out of contact with the valve seat 12 provided radially outward of the opening portion (the outlet port 15). The valve unit 11 includes the hollow portion 17 between the upper surface 11a of the valve unit 11 on the valve seat 12 side and the lower surface 11b of the valve unit 11 on the exhaust pump 3 side, and further includes the first planar heater (the first rubber heater 23) covering the upper rear-side face 18a of the upper surface 11a in the hollow portion 17 and the second planar heater (the second rubber heater 24) covering the second rear-side face 19a of the lower surface 11b in the hollow portion 17.

According to the above-mentioned pressure control valve 1, the valve unit 11 is formed with the hollow portion 17 formed between the upper surface 11a of the valve unit 11 on the vacuum chamber 2 side and the lower surface 11b of the valve unit 11 on the exhaust pump 3 side, and thus the thermal capacity is made small. In addition to this, there are provided a first planar heater (the first rubber heater 23) covering the first rear-side face 18a of the upper surface 11a in the hollow portion 17 and a second planar heater (the second rubber heater 24) covering the second rear-side face 19a of the lower surface 11b in the hollow portion 17, and thus the entire upper surface 11a and the entire lower surface 11b of the valve unit 11 can be uniformly heated.

In evacuation of the vacuum chamber 2, the process gas mainly comes to contact with the upper surface 11a and the lower surface 11b of the valve unit 11. Accordingly, as long as the entire upper surface 11a and the entire lower surface 11b of the valve unit 11 are uniformly heated, the process gas can be prevented from cooling by the valve unit 11. This achieves prevention of deposition of the process gas components on the surface of the valve unit 11, and further achieves reduction in the possibility of failure in the surface processing of the wafer which is caused by floating of the deposited components as particles.

Heretofore, there has been known that the process gas components deposited on the upper surface 11a of the valve unit 11 could possibly float as the particles in the vacuum chamber 2. However, the process gas components deposited on the lower surface 11b of the valve unit 11 have not been considered to float in the vacuum chamber 2 since the components would flow out with the process gas at the time of evacuation. The present inventors however believe that the process gas components deposited on the lower surface would float as the particles in the vacuum chamber 2. Accordingly, the above-mentioned pressure control valve 1 prevents generation of the particles by heating both the upper surface 11a and the lower surface 11b of the valve unit 11 by planar heaters (the rubber heaters 23 and 24).

Further, in the above-mentioned pressure control valve 1, preferably, a thickness from the upper surface 11a to the first rear-side face 18a and a thickness from the lower surface 11b to the second rear-side face 19a are both preferably 4 mm or larger and 8 mm or less.

When the thickness from the upper surface 11a to the first rear-side face 18a and the thickness from the lower surface 11b to the second rear-side face 19a are thin, the thermal capacity of the valve unit 11 becomes small, and thus heating by the first planar heater and the second planar heater (the first rubber heater 23, the second rubber heater 24) is facilitated. On the other hand, the strength of the valve unit 11 becomes low. Therefore, it is important to make a balance between the thermal capacity and the strength. The present inventors have confirmed by experiments that, like the above-mentioned pressure control valve 1, the thermal capacity and the strength can be kept their balance by arranging the thickness from the upper surface 11a to the first rear-side face 18a and the thickness from the lower surface 11b to the second rear-side face 19a as 4 mm or larger and 8 mm or less.

Further, in the above-mentioned pressure control valve 1, preferably, the valve unit 11 is provided with the annular sealing portion (the O ring 22) to be in and out of contact with the valve seat 12, and the hollow portion 17 is positioned on the inner circumferential side in the radial direction of the annular sealing portion (the O ring 22).

The valve unit 11 provided with the hollow portion 17 has lower strength than a solid valve unit. Accordingly, in the case where the hollow portion 17 of the valve unit 11 is provided on a rear side of the annular sealing portion (the O ring 22), for example, when the annular sealing portion (the O ring 22) comes to contact with the valve seat 12, the valve unit 11 could be bent to absorb the force for pressing the annular sealing portion (the O ring 22) to the valve seat 12. According to the above-mentioned pressure control valve 1, the hollow portion 17 is positioned on the inner circumferential side in the radial direction of the annular sealing portion (the O ring 22), and thus the rear side of the annular sealing portion (the O ring 22) of the valve unit 11 can be made solid, thereby preventing bending of the valve unit 11. Owing to this configuration, the force for pressing the annular sealing portion (the O ring 22) to the valve seat 12 can be prevented from absorption.

Second Embodiment

Figure 6:
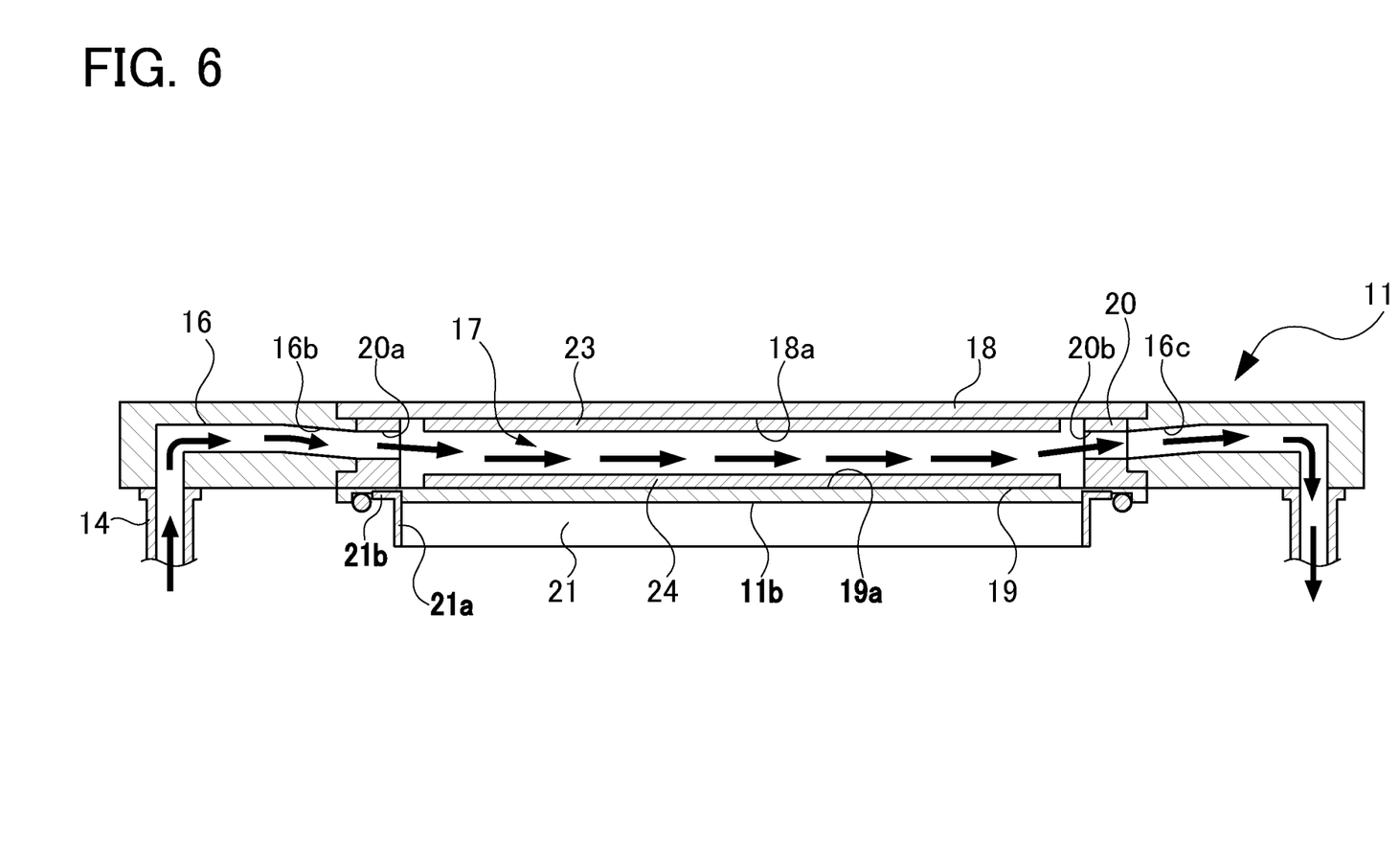
FIG. 6 is a view showing a configuration of a pressure control valve in a second embodiment.

Next, a second embodiment of a pressure control valve according to the present invention is explained with reference to FIG. 6. FIG. 6 is a view showing a configuration of the valve unit 11 of the pressure control valve 1 according to the second embodiment.

In the pressure control valve 1 according to the second embodiment, the electrical conduits 16b and 20a are utilized as cooling gas supply passages through which the cooling gas is to be supplied to the hollow portion 17. In this case, there needs to provide discharge paths 16c and 20b for discharging the cooling gas that has been supplied to the hollow portion 17 from the hollow portion 17. Thereby, as indicated with allows in FIG. 6, flow of the cooling gas is generated. Other configuration is same as the pressure control valve 1 according to the first embodiment. Herein, aside from the electrical conduits 16b and 20a, there may be provided another cooling gas supply passage communicated with the hollow portion 17.

Since temperature conditions for surface processing of a wafer differ depending on types of process gases, there is a case that the temperature of the valve unit 11 of the pressure control valve 1 needs to be lowered. Heretofore, waiting time has been required for natural reduction in the temperature of the valve unit, which has resulted in efficiency degradation in the surface processing step of the wafer. According to the above-mentioned pressure control valve 1, the hollow portion 17 is communicated with the cooling gas supply passages (the electrical conduits 16b and 20a) to supply the cooling gas, and thus the temperature of the valve unit can be quickly lowered by supplying the cooling gas to the hollow portion 17.

Herein, the above-mentioned embodiments are only illustrations and give no any limitation to the present invention. Accordingly, the present invention can naturally be made with various improvements and modifications without departing from the scope of disclosure. For example, the planar heater may be another type other than the rubber heater.

REFERENCE SIGNS LIST

1 Pressure control valve
2 Vacuum chamber
3 Exhaust pump
11 Valve unit
11a Upper surface
11b Lower surface
12 Valve seat
15 Outlet port (One example of an opening portion)
17 Hollow portion
18a First rear-side face
19a Second rear-side face
23 First rubber heater (One example of a first planar heater)
24 Second rubber heater (One example of a second planar heater)

The invention claimed is:

1. A pressure control valve configured to open and close an opening portion of a circular shape, the opening portion connecting a vacuum chamber used for a semiconductor manufacturing apparatus and an exhaust pump for evacuating the vacuum chamber, wherein the pressure control valve comprises a valve unit to be brought into or out of contact with a valve seat provided outward in a radial direction of the opening portion, the valve unit includes:

a hollow portion positioned between an upper surface of the valve unit on a side of the vacuum chamber and a lower surface of the valve unit on a side of the exhaust pump;

a first planar heater covering a first rear-side face of the upper surface in the hollow portion; and a second planar heater covering a second rear-side face of the lower surface in the hollow portion, the valve unit includes an annular sealing portion to be brought into or out of contact with the valve seat, the hollow portion is positioned on an inner circumferential side in a radial direction of the annular sealing portion, and a diameter of the hollow portion is smaller than a diameter of the annular sealing portion.

2. The pressure control valve according to claim 1, wherein a thickness from the upper surface to the first rear-side face and a thickness from the lower surface to the second rear-side face are 4 mm or larger and 8 mm or less.

3. The pressure control valve according to claim 2, wherein a cooling gas supply passage configured to supply cooling gas is communicated with the hollow portion.

4. A pressure control valve configured to open and close an opening portion of a circular shape, the opening portion connecting a vacuum chamber used for a semiconductor manufacturing apparatus and an exhaust pump for evacuating the vacuum chamber, wherein the pressure control valve comprises a valve unit to be brought into or out of contact with a valve seat provided outward in a radial direction of the opening portion, the valve unit includes:

a hollow portion positioned between an upper surface of the valve unit on a side of the vacuum chamber and a lower surface of the valve unit on a side of the exhaust pump;

a first planar heater covering a first rear-side face of the upper surface in the hollow portion; and a second planar heater covering a second rear-side face of the lower surface in the hollow portion, and a cooling gas supply passage configured to supply cooling gas is communicated with the hollow portion.

* * * * *